(12) United States Patent
Brochard (10) Patent No.: US 10,829,233 B2
(45) Date of Patent: Nov. 10, 2020

(54) ENGINE ASSEMBLY FOR AN AIRCRAFT COMPRISING A FRONT ENGINE ATTACHMENT WHICH FACILITATES ITS ASSEMBLY

(71) Applicant: Airbus Operations SAS, Toulouse (FR)

(72) Inventor: Wolfgang Brochard, Carbonne (FR)

(73) Assignee: Airbus Operations SAS, Toulouse (FR)

( * ) Notice: Subject to any disclaimer, the term of this patent is extended or adjusted under 35 U.S.C. 154(b) by 328 days.

(21) Appl. No.: 15/850,115

(22) Filed: Dec. 21, 2017

(65) Prior Publication Data

US 2018/0186462 A1 Jul. 5, 2018

(30) Foreign Application Priority Data

Dec. 30, 2016 (FR) ...................................... 16 63542

(51) Int. Cl.
*B64D 27/26* (2006.01)
*F02C 7/20* (2006.01)

(52) U.S. Cl.
CPC ................ *B64D 27/26* (2013.01); *F02C 7/20* (2013.01); *B64D 2027/266* (2013.01); *B64D 2027/268* (2013.01); *F05D 2240/90* (2013.01)

(58) Field of Classification Search
CPC .............. B64D 27/26; B64D 2027/268; B64D 2027/266; B64D 27/02; B64D 2027/262; B64D 2027/628; F02C 7/02; F05D 2240/90; B64F 5/10
See application file for complete search history.

(56) References Cited

U.S. PATENT DOCUMENTS

| 5,474,258 | A | * | 12/1995 | Taylor | .................... | B64D 27/26 244/54 |
| 5,871,177 | A | | 2/1999 | Demouzon et al. | | |
| 6,173,919 | B1 | * | 1/2001 | Le Blaye | ............... | B64D 27/26 244/54 |

(Continued)

FOREIGN PATENT DOCUMENTS

| CA | 2602161 A1 * | 9/2006 | ............. | B64D 27/26 |
| EP | 3015368 A1 * | 5/2016 | ............. | B64D 27/26 |

(Continued)

OTHER PUBLICATIONS

French Search Report, dated Sep. 19, 2017, priority document.

*Primary Examiner* — Magdalena Topolski
(74) *Attorney, Agent, or Firm* — Greer, Burns & Crain, Ltd.

(57) ABSTRACT

For fitting of a front engine attachment of an engine assembly for an aircraft, a shearing pin is oriented in a longitudinal direction and is integral with a front closure rib of the strut housing and projects forward, a main attachment body is arranged axially opposite the intermediate casing hub, at the rear of the latter, the main attachment body having an orifice for accommodation of the shearing pin, an arrangement for securing the main attachment body on the engine, and an arrangement for axial retention of the main attachment body relative to the rib, the axial retention arrangement comprising first screws, the heads of which cooperate with the rib, as well as barrel nuts which cooperate with the screws, and are accommodated in the main attachment body.

12 Claims, 5 Drawing Sheets

(56) References Cited

U.S. PATENT DOCUMENTS

| | | | | |
|---|---|---|---|---|
| 8,074,923 B2* | 12/2011 | Foster | ............... | F01D 25/28 244/54 |
| 8,083,176 B2* | 12/2011 | Lafont | ............... | B64D 27/26 244/54 |
| 9,217,337 B2* | 12/2015 | Sandy | ............... | F01D 25/28 |
| 2007/0138337 A1* | 6/2007 | Audart-Noel | ............... | F16C 27/02 244/53 R |
| 2007/0228213 A1 | 10/2007 | Diochon et al. | | |
| 2012/0023899 A1* | 2/2012 | Yasuda | ............... | F02K 3/06 60/224 |
| 2012/0080554 A1 | 4/2012 | Lafont et al. | | |
| 2013/0200211 A1* | 8/2013 | Zheng | ............... | B64D 27/26 244/54 |
| 2014/0084129 A1* | 3/2014 | Sandy | ............... | B64D 27/26 248/554 |
| 2015/0147151 A1* | 5/2015 | Mogle, II | ............... | B25B 11/02 414/800 |
| 2015/0336678 A1 | 11/2015 | Cassagne et al. | | |
| 2016/0122030 A1 | 5/2016 | Marche | | |
| 2017/0240288 A1* | 8/2017 | Pautis | ............... | B64D 29/06 |
| 2017/0370292 A1* | 12/2017 | Beier | ............... | F02C 7/20 |
| 2018/0127105 A1* | 5/2018 | Orteu | ............... | F16C 11/045 |
| 2018/0171876 A1* | 6/2018 | Yang | ............... | F01D 25/26 |
| 2019/0135445 A1* | 5/2019 | Combes | ............... | B64D 27/26 |
| 2019/0168861 A1* | 6/2019 | Fotouhie | ............... | B64C 15/12 |
| 2019/0217964 A1* | 7/2019 | Alstad | ............... | B64D 27/20 |
| 2019/0368531 A1* | 12/2019 | Tulloch | ............... | B64D 27/26 |

FOREIGN PATENT DOCUMENTS

| | | | | |
|---|---|---|---|---|
| FR | 2755944 | | 5/1998 | |
| FR | 2873985 | | 2/2006 | |
| FR | 2963320 A1 * | | 2/2012 | ............ B64D 27/26 |
| FR | 2965548 | | 4/2012 | |
| FR | 3014840 | | 6/2015 | |
| FR | 3021298 | | 11/2015 | |
| FR | 3027873 | | 5/2016 | |
| FR | 3029504 | | 6/2016 | |
| WO | WO-2016112187 A2 * | | 7/2016 | ............ B64D 27/26 |

* cited by examiner

ENGINE ASSEMBLY FOR AN AIRCRAFT COMPRISING A FRONT ENGINE ATTACHMENT WHICH FACILITATES ITS ASSEMBLY

CROSS-REFERENCES TO RELATED APPLICATIONS

This application claims the benefit of the French patent application No. 1663542 filed on Dec. 30, 2016, the entire disclosures of which are incorporated herein by way of reference.

TECHNICAL FIELD

The present invention relates to the field of engine assemblies for aircraft comprising an engine, as well as to a device for coupling the engine on a structure of the aircraft, preferably below a wing of this aircraft. The invention preferably applies to commercial aircraft.

BACKGROUND OF THE INVENTION

A coupling device of this type is known for example from document FR 3 014 840.

In existing aircraft, engines such as bypass and two-spool turbojet engines are typically coupled below or above the wing unit, or are attached to the fuselage by complex coupling devices also known as EMSs (Engine Mounting Structures), or else coupling struts. The coupling struts typically used have a primary structure, also known as a rigid structure. This primary structure generally forms a housing, i.e., it is constituted by the assembly of lower and upper spars which are connected to one another by a plurality of transverse strengthening ribs situated inside the housing. The spars are arranged on the lower and upper faces, whereas lateral panels close the housing at the lateral faces.

In a known manner, the primary structure of these coupling devices is designed to permit transmission to the wing unit of the static and dynamic forces generated by the engines, such as the weight, thrust, or else the various dynamic forces.

In the solutions known from the prior art, the forces are conventionally transmitted between the engine and the primary structure by coupling means constituted by a front engine attachment, a rear engine attachment, and a thrust force pick-up device. Together these elements form an isostatic attachment system.

For example, the front engine attachment is secured on the central casing of the engine, or on the hub of an intermediate casing situated between the central casing and the fan casing.

The coupling means thus ensure transmission of the forces in the direction of the strut, while limiting the internal deformations of the engine. In order to permit the soundest possible transmission of the forces between the engine and the rigid structure, the front engine attachment must be situated axially as close as possible to the hub of the intermediate casing, in order to move closer to the force pick-up plane formed by this intermediate casing equipped with structural arms.

However, the fact of moving closer to the hub of the intermediate casing makes the assembly of the front engine attachment a delicate operation, since the axial space between these elements becomes restricted. The introduction and manipulation of the tools and of the elements for securing this attachment are complicated, all the more so when the hub has an intermediate casing hub with a large diameter, as is the case for turbojet engines with a fan which is driven by a reducer.

There is therefore a need to optimize the design of the front engine attachment in order to facilitate its assembly.

SUMMARY OF THE INVENTION

In order to fulfil this need, a subject of the invention is an engine assembly for an aircraft comprising:
- a two-spool engine comprising a fan casing, a central casing, as well as an intermediate casing situated axially between the fan casing and the central casing, the intermediate casing comprising a hub, an external collar situated in the extension of the fan casing, as well as structural arms connecting the hub to the external collar;
- a strut for coupling the engine on a structure of the aircraft, the strut comprising a primary structure forming a housing;
- means for coupling the engine on the primary structure of the coupling strut, the coupling means comprising a front motor attachment which connects the primary structure to the hub of the intermediate casing or to the central casing, and is configured to pick up at least forces which are exerted in a transverse direction and in a vertical direction of the engine assembly.

According to the invention, the front engine attachment comprises:
- a shearing pin which is oriented in a longitudinal direction of the engine assembly, the pin being integral with a front closure rib of the housing and projecting forwards;
- a main attachment body which is arranged axially opposite the intermediate casing hub, at the rear of the latter, the main attachment body having an orifice for accommodation of the shearing pin;
- means for securing the main attachment body on the engine; and
- means for axial retention of the main attachment body relative to the front closure rib, these axial retention means comprising first screws, the head of which cooperates with the front closure rib, as well as barrel nuts which cooperate with the first screws, and are accommodated in the main attachment body.

The invention is thus distinguished in that it provides a front engine attachment design which requires only limited access, or even no access, in order to be assembled, between the main attachment body and the hub of the intermediate casing. The front engine attachment can thus be brought as close as possible to the hub, even when the latter has a large diameter, and for more direct transmission of forces in the plane of the intermediate casing.

The invention provides at least one of the following optional characteristics, taken in isolation or in combination.

The main attachment body comprises a main armature supporting a ball joint, an inner ball joint ring of which defines the accommodation orifice which receives the shearing pin.

The main attachment body comprises protuberances which project at the front, the protuberances accommodating the barrel nuts.

The protuberances comprise blind holes which receive the barrel nuts.

The heads of the first screws are supported against securing ears of the front closure rib.

The main attachment body is entirely shielded at the front by the intermediate casing hub, in the longitudinal direction.

The means for securing the main attachment body on the engine are articulated shackles.

The axial retention means also comprise a second screw which is oriented in the longitudinal direction of the engine assembly, and passes through the main attachment body, as well as the front closure rib, so as, with the shearing pin, to ensure jointly the pick-up of the forces associated with the parasitic torsion moment in the longitudinal direction. Alternatively, the front closure rib is equipped with a second shearing pin parallel to the pin, such that the two pins ensure jointly the pick-up of the forces associated with the parasitic torsion moment in the longitudinal direction.

The engine preferably comprises a fan which is driven by a reducer.

The invention also relates to an aircraft comprising at least one such engine assembly.

Finally, the invention relates to a process for fitting such an engine assembly, comprising the following steps:
- securing of the main attachment body on the engine by means of the securing means;
- vertical displacement of the engine relative to the coupling strut secured on the aircraft, such that the shearing pin is aligned with, and axially distant from, the orifice for accommodation of the main attachment body;
- axial displacement of the engine relative to the coupling strut secured on the aircraft, so as to make the shearing pin penetrate into the orifice for accommodation of the main attachment body; and
- putting into place and securing of the first screws, from an area situated at the rear of the main attachment body.

Other advantages and characteristics of the invention will become apparent in the following non-limiting detailed description.

BRIEF DESCRIPTION OF THE DRAWINGS

This description will be provided with reference to the appended drawings, in which.

DETAILED DESCRIPTION OF THE PREFERRED EMBODIMENTS

Figure 1:
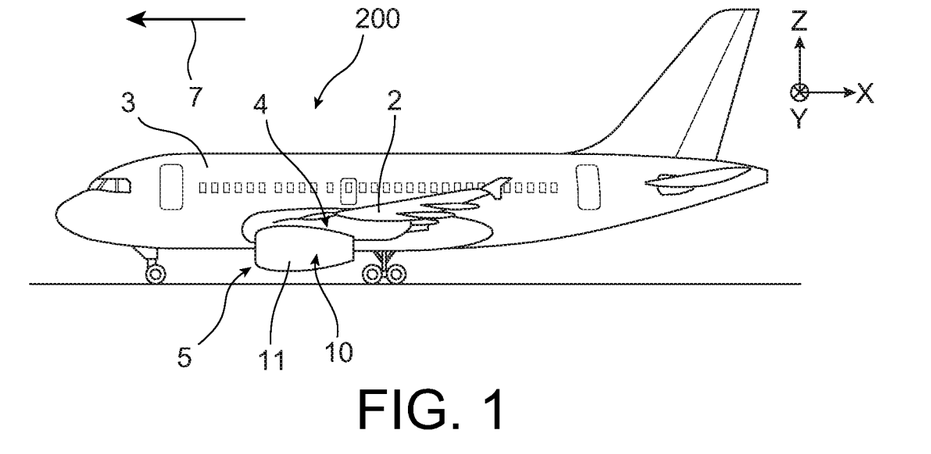
FIG. 1 represents a side view of an aircraft comprising engine assemblies according to the invention.

FIG. 1 represents an aircraft 200 comprising a fuselage 3 on which two wing unit elements 2 are secured (only one of which is shown in FIG. 1), each wing unit element supporting an engine assembly 5 according to the invention. This engine assembly 5, which is also known as the propulsion assembly, comprises a bypass and two-spool engine 10, such as a turbojet engine, a device 4 for coupling of the engine 10, also known as coupling strut, as well as a nacelle 11 which surrounds the engine. Conventionally, the engine assembly 5 is suspended below its wing 2. However, it could be coupled above the wing unit, or added onto the rear part of the fuselage.

Throughout the following description, by convention, the direction X corresponds to the longitudinal direction of the device 4 which can also be assimilated to the longitudinal direction of the turbojet engine 10 and to that of the engine assembly 5, this direction X being parallel to a longitudinal axis of this turbojet engine 10. In addition, the direction Y corresponds to the direction which is oriented transversely relative to the device 4, and can also be assimilated to the transverse direction of the turbojet engine and to that of the engine assembly 5, and the direction Z corresponds to the vertical direction or to the height, these three directions X, Y and Z being orthogonal to one another.

In addition, the terms "front" and "rear" are to be considered relative to a direction of advancement of the aircraft encountered further to the thrust exerted by the turbojet engines 10, this direction being represented schematically by the arrow 7.

Figure 2:
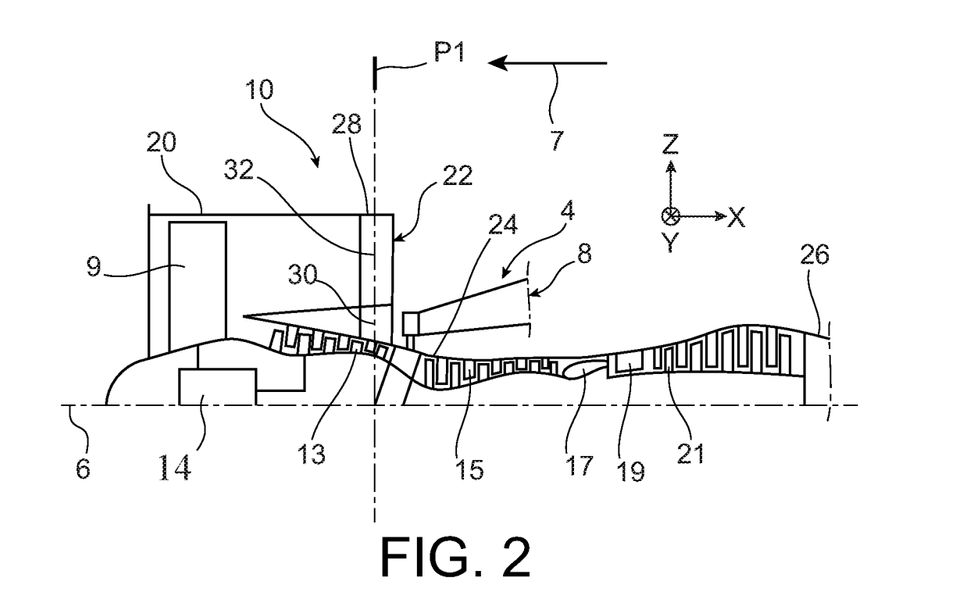
FIG. 2 is a schematic view in longitudinal cross section of an engine equipping one of the engine assemblies of the aircraft shown in the preceding figure.

With reference to FIG. 2, it can first of all be noted that the turbojet engine 10 is preferably a turbojet engine, the fan of which is driven not directly by the gas generator but by a reducer 14 which itself is driven by the gas reducer. From the front to the rear, the latter comprises a low-pressure compressor 13, a high-pressure compressor 15, a combustion chamber 17, a high-pressure turbine 19 and a low-pressure turbine 21 as has been schematized in FIG. 2.

The turbojet engine comprises a structural outer envelope formed by different casings. From the front to the rear, these are a fan casing 20, an intermediate casing 22, a central casing 24 and a gas discharge casing 26. The intermediate casing 22 comprises an external collar 28 which is situated in the rear extension of the fan casing, with substantially the same diameter. In its interior, this collar 28 supports structural radial arms 32, which are connected at their inner end to a hub 30 of the fan casing. These radial arms 32 are also known as OGVs (Outlet Guide Vanes). The elements 28, 30, 32 of the intermediate casing are intersected by a transverse plane P1 of the turbojet engine 10, which passes via a rear end of the low-pressure compressor 13.

Figure 3:
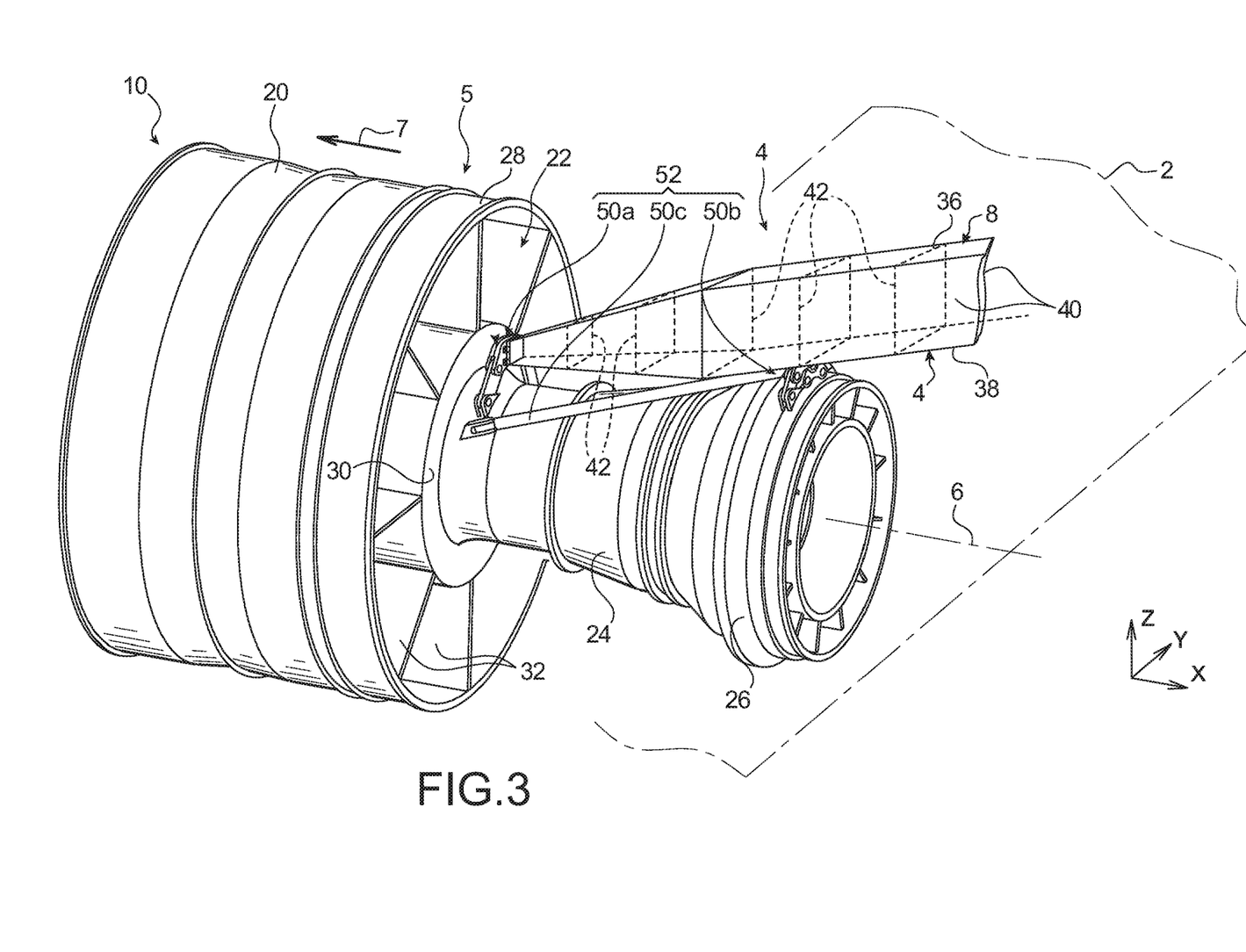
FIG. 3 is a partial view in perspective of one of the engine assemblies, according to a preferred embodiment of the invention.
Figure 4:
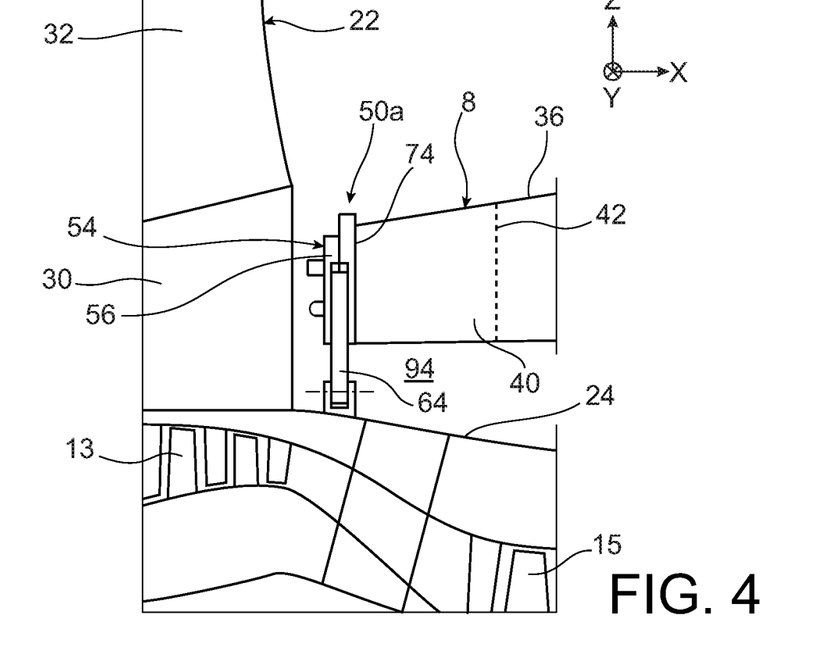
FIG. 4 represents a partial side view of the engine assembly shown in the preceding figure, showing more particularly the front motor attachment.
Figure 5:
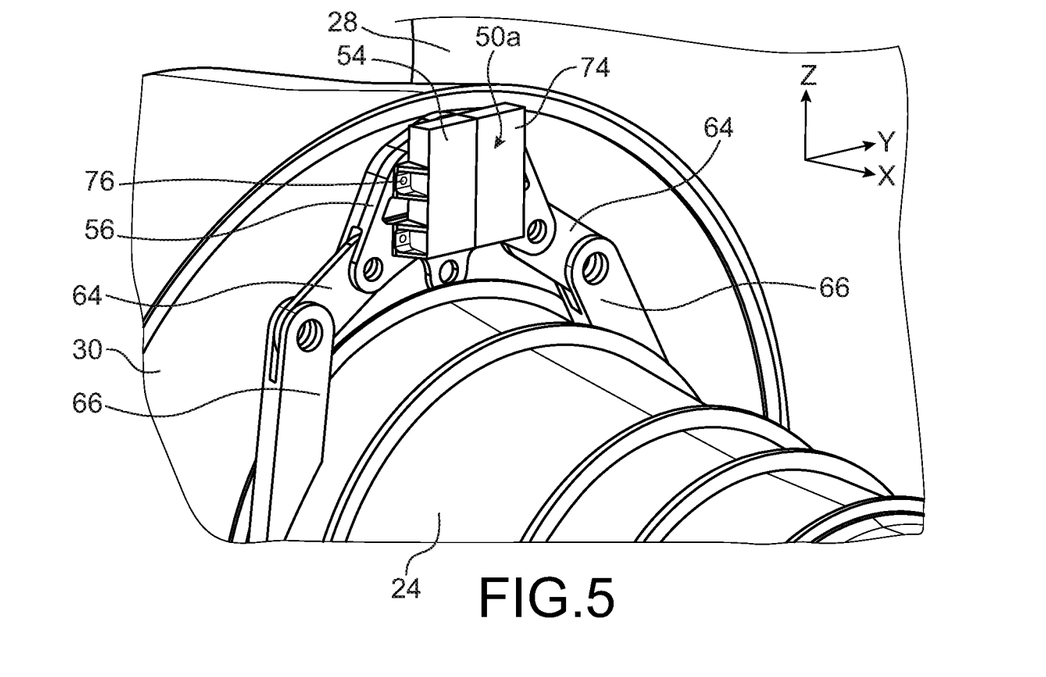
FIG. 5 is a view in perspective of the part of the engine assembly shown in the preceding figure.

With reference to FIG. 3, the engine assembly 5 also comprises the coupling strut, the primary structure 8 of which is represented, but not the secondary structures which are designed to be added onto this primary structure 8. These secondary structures are conventional, and will not be described in detail hereinafter. They ensure the segregation and retention of the systems, while supporting aerodynamic fairing elements.

The primary structure 8 forms a housing, i.e., it is formed by upper 36 and lower 38 spars, and two lateral panels 40. These housing elements are connected to one another by means of transverse inner strengthening ribs 42 which are typically oriented according to parallel planes YZ. These ribs are distributed in the housing along the direction X. It is also possible to provide a more "integrated" design of the housing, in accordance with the one previously described.

The housing 8 is secured to the wing unit element 2 by conventional means, not described. In addition, the engine 10 is coupled below the wing to the housing 8 by coupling means 52 which are preferably constituted by a front engine attachment 50a, a rear engine attachment 50b, and two connecting rods 50c to pick up the thrust forces. The rear engine attachment 50b connects the discharge casing 26 to the lower spar 38 of the housing. The front engine attachment 50a, for its part, is specific to the present invention, and connects the front end of the housing to a front end of the central casing 24, very close to the hub 30 of the intermediate casing.

Preferably, the coupling means 52 form an isostatic force pick-up system. In fact, the front engine attachment 50a ensures only the pick-up of the forces in the directions Y and Z, whereas the connecting rods 50c ensure only the pick-up of the forces in the direction X. The rear engine attachment 50b defines two lateral half-attachments arranged on either side of the median vertical plane XZ. The first half-attachment is designed to ensure only the pick-up of the thrust forces oriented in the direction Z, and the second half-attachment is designed to ensure only the pick-up of the thrust forces oriented in the directions Y and Z. Depending on the configuration, the forces in the direction Y can also be picked up in the center of the engine beam, and would then be picked up by the second half-attachment only in the event of a fault.

Thus, the forces which are exerted in the direction X are picked up by means of the connecting rods 50c, the forces which are exerted in the direction Y are picked up by means of the front engine attachment 50a and the second rear half-attachment, whereas the forces which are exerted in the direction Z are picked up jointly by means of the front engine attachment 50a and the two rear half-attachments.

In addition, the moment which is exerted in the direction X is picked up vertically by means of the two rear half-attachments, the moment which is exerted in the direction Y is picked up vertically by means of these two half-attachments jointly with the front engine attachment 50a, and the moment which is exerted in the direction Z is picked up transversely by means of the second rear half-attachment jointly with the front engine attachment 50a.

The front engine attachment 50a will now be described with reference to FIGS. 4 to 9.

Firstly, it comprises a main attachment body 54 which is situated in close axial proximity to the rear end of the hub 30. This hub, which has a consequent diameter because of the presence of the reducer, shields the main attachment body 54 at the rear in the direction X. More preferably, it is all of the front engine attachment 50a which is shielded at the front by the hub 30 of the intermediate casing. In other words, the attachment 50a does not extend beyond the hub 30 in the radial direction.

The main attachment body 54 is formed by a main armature 56 which extends in a plane YZ. This armature can be doubled in the direction X for safety reasons, and thus provide a so-called fail-safe function. On its front face, the main armature 56 supports axial protuberances 58 which project towards the front, for example three protuberances 58 which are arranged in the vicinity of the periphery of the armature 56. The protuberances 58 are preferably produced in a single piece with the main armature 56, or are added onto the latter.

The main armature 56 is equipped in its center with a ball joint 60 comprising an outer ring 60a, as well as an inner ring 60b pierced by an orifice 62 for accommodation of a shearing pin which will be described hereinafter. The orifice 62 is a through orifice, and has an axis parallel to the direction X.

The attachment 50a comprises means for securing the main armature 56 on the front end of the central casing 24. These means comprise two shackles 64 or rocker bars, which are articulated at one of their ends on the main armature 56, and are articulated at the other end on clevises 66 of the central casing 24. The axes of articulation of the shackles are preferably oriented in the direction X. In addition, the two shackles 64 are preferably arranged in the form of a "V" which is open downwards, in order to pick up forces Y and Z. The directions of picking up forces of the shackles 64 intersect at the center of the pin 70, in order to reduce the parasitic moment in the direction X, as will be described hereinafter.

The attachment 50a is also equipped with a shearing pin 70 which is oriented in the direction X and is accommodated in the orifice 62 in the ball joint supported by the main armature 56. Preferably, in the assembled state, the pin passes through the orifice 62 entirely, and projects slightly from the latter at the front. The pin 70 and the accommodation orifice 62 have complementary circular cross sections. The pin 70 is integral with a front closure rib 74 of the housing 8, and is produced in a single piece with this rib. More specifically, in order to provide a fail-safe function, the rib 74 and the pin 70 are formed by two parts placed against one another in the direction Y, and each comprising a half-rib and a half-pin. It should also be noted that the rib 74 could be one or more independent part(s) added onto the other elements of the housing, or one or more part(s) integrated with these same housing elements, such as the spars and/or the lateral panels.

Projecting laterally from its lateral edges, the front closure rib 74 comprises securing ears 76 which cooperate with means for axial retention of the main body 54 relative to the rib 74. In this case, these means comprise three first screws 78a, the head of which cooperates with the ears 76, while being supported on the rear surface of the latter. The three first screws 78a thus each have a threaded part which extends towards the front in the direction X, and is screwed into a barrel nut 80. Each barrel nut 80 is accommodated in a blind hole 82 of one of the protuberances 58 of the main attachment body. The blind hole 82 is open at the top and/or laterally, but preferably not at the bottom, in order to prevent the barrel nut 80 from coming out of this hole during the manipulation before assembly of the associated screw 78a.

Figures 9, 10:
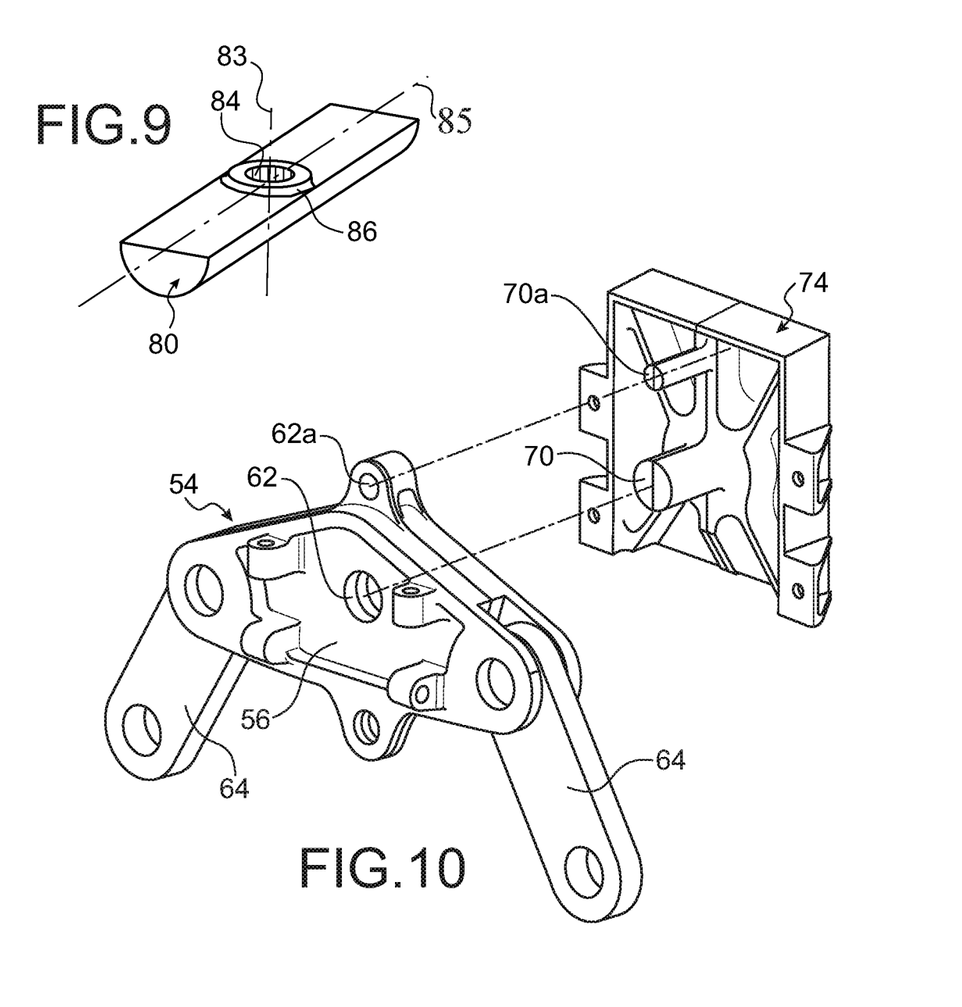
FIG. 9 is a view in perspective of a barrel nut implemented in order to produce the front engine attachment shown in the preceding figures.
FIG. 10 is a view in perspective similar to that of FIG. 6, representing an alternative embodiment.

It will be remembered that a barrel nut is in general a nut with a cylindrical outer surface, the axis 85 of which is perpendicular to the axis 83 of the tapped hole 84 which passes through it. This axis 83 coincides with the axis of the screw 73, i.e., in this case it is oriented in the direction X. A barrel nut can be produced in one or two pieces, as applicable. In the second case, it comprises a floating nut, which is fitted in a receptacle formed in a cylindrical support. This type of nut is also known as a shank nut or sleeve nut.

Thus, the barrel nut 80, which is blocked by the blind hole 82 in rotation and in translation according to the axis 83 of the tapped hole 84, permits easy assembly of the first screw 78a which is designed to be screwed into this same tapped hole 84. The latter can also be extended by a flange 86 which is deformed, for example elliptically, in order to permit the blocking in rotation in the direction X of this screw 78a.

Figure 8:
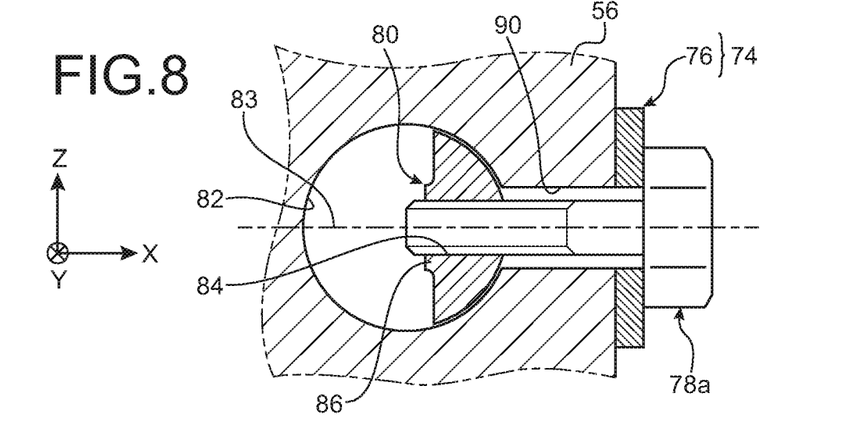
FIG. 8 is a view in cross section taken along the line VIII-VIII in FIG. 7.

As shown in FIG. 8, each first screw 78a passes with play through a passage hole 90 provided in the main armature 56. This makes it possible to facilitate the assembly of these three screws 78a in their respective nuts 80.

Although this has not been represented, the barrel nut 80 could alternatively be a non-truncated cylinder with a circular cross section, without departing from the context of the invention.

It is also possible for the front engine attachment 50a to be able to pick up forces associated with the parasitic torsion moment in the direction X. For this purpose, the forces are picked up vertically, firstly by means of the shearing pin 70, and secondly by means of a second screw 78b. This second screw 78b passes with very slight play through the passage hole 90 in the main armature 56, in order to obtain adjusted assembly. The screw is screwed onto a conventional nut (not represented) supported against the front surface of this main armature 56. The head of the second screw 78b, for its part, is supported against one of the ears 79 of the front closure rib 74, just like the three first screws 78a. In addition, the four screws 78a, 78b are distributed around the shearing pin 70 which is centered relative to the latter. Alternatively, in order to ensure this same function, the rib 74 could be equipped with a second shearing pin parallel to the pin 70. This embodiment is shown in FIG. 10. The second pin 70a, which has a smaller diameter, is situated above the shearing pin 70, and penetrates into an orifice 62a for accommodation of the main armature 56.

Figure 6:
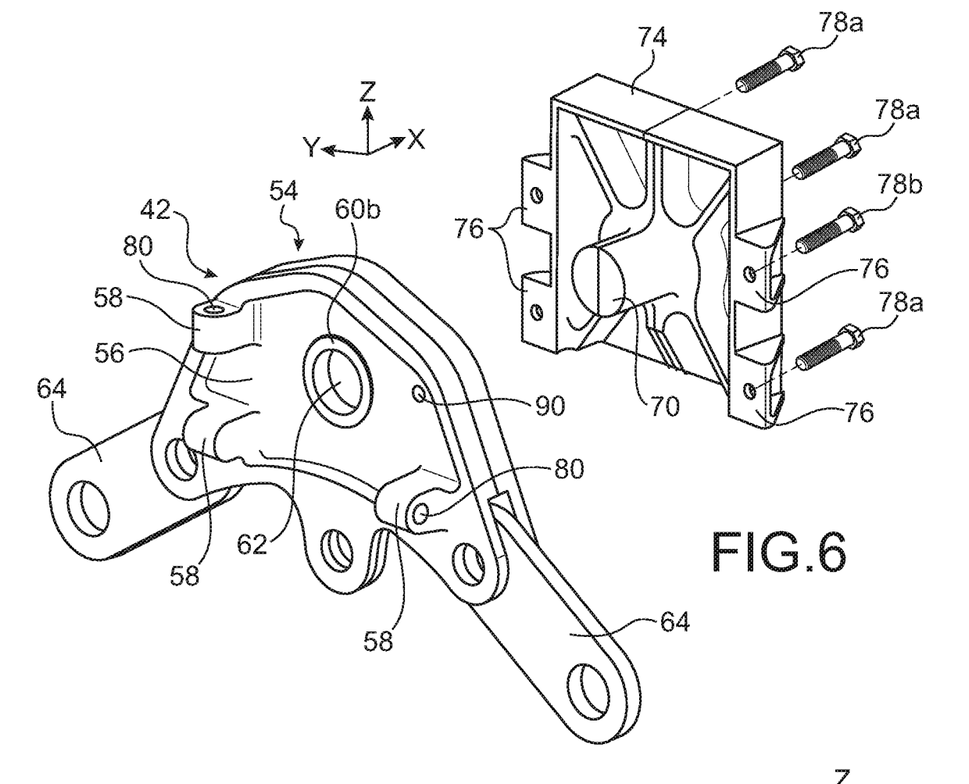
FIG. 6 is an exploded view in perspective of the front engine attachment shown in the preceding figure.
Figures 7, 7A:
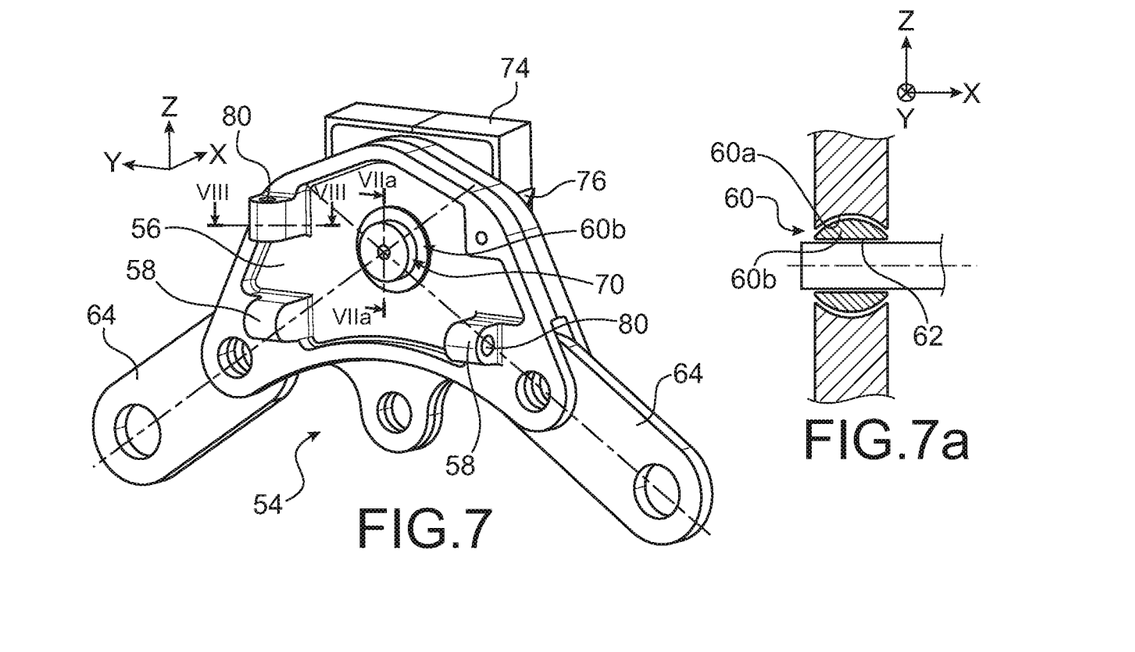
FIG. 7 is a non-exploded view in perspective of the front engine attachment shown in the preceding figure.
FIG. 7a is a view in cross section taken along the line VIIa-VIIa in FIG. 7.

The above-described engine assembly 5 permits easy assembly, which requires only slight axial access between the hub 30 of the intermediate casing and the main attachment body 54. In fact, the main attachment body 54 is firstly secured on the central casing 24 by means of shackles 64. At this stage, the barrel nuts 80 can be accommodated in the protrusions 58. Next, the engine is displaced vertically relative to the coupling strut 4 secured below the wing of the aircraft, such that the shearing pin 70 is aligned with, and distant from, the accommodation orifice 62, in the direction X. This state is represented in FIG. 6. The process is continued by displacing the engine axially relative to the strut, so as to make the shearing pin 70 penetrate into the orifice for accommodation of the main attachment body 54, as shown in FIG. 7. Finally, the first screws 78a are put into place from an area 94 referenced in FIG. 4, situated at the rear of the main attachment body 54. No access is therefore required from the other side of the body 54 in order to screw the screws 78a into their respective barrel nuts 80. The assembly is completed when the main attachment body 54 is placed against the securing ears 76 of the front closure rib 74. It should be noted that in the case of implementation of the second screw 78b, the latter is assembled before the first screws 78a, in order to facilitate its securing.

It will be appreciated that various modifications can be made to the invention which has just been described, purely by way of non-limiting example, by persons skilled in the art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine assembly for an aircraft comprising:
a two-spool engine comprising a fan casing, a central casing, as well as an intermediate casing situated axially between the fan casing and the central casing, the intermediate casing comprising a hub, an external collar situated in an extension of the fan casing, as well as structural arms connecting the hub to the external collar;
a strut configured to couple the engine on a structure of the aircraft, the strut comprising a primary structure forming a housing;
means for coupling the engine on the primary structure of the strut, the coupling means comprising a front motor attachment which connects the primary structure to the hub of the intermediate casing or to the central casing, and is configured to pick up at least forces which are exerted in a transverse direction and in a vertical direction of the engine assembly,
wherein the front motor attachment comprises:
a shearing pin oriented in a longitudinal direction of the engine assembly, the shearing pin being integral with a front closure rib of the housing and projecting forwards;
a main attachment body arranged axially opposite the hub of the intermediate casing, at a rear of the latter, the main attachment body having an orifice for accommodation of the shearing pin;
means for securing the main attachment body on the engine; and
means for axial retention of the main attachment body relative to the front closure rib, these axial retention means comprising first screws, a head of which cooperates with the front closure rib, as well as barrel nuts which cooperate with the first screws, and are accommodated in the main attachment body, wherein the first screws each comprise a threaded part which extends in the longitudinal direction.

2. The engine assembly according to claim 1, wherein the main attachment body comprises a main armature supporting a ball joint, an inner ball joint ring of which defines the accommodation orifice which receives the shearing pin.

3. The engine assembly according to claim 1, wherein the main attachment body comprises protuberances which project at a front, the protuberances accommodating the barrel nuts.

4. The engine assembly according to claim 3, wherein the protuberances comprise blind holes which receive the barrel nuts.

5. The engine assembly according to claim 1, wherein the heads of the first screws are supported against securing ears of the front closure rib.

6. The engine assembly according to claim 1, wherein the main attachment body is entirely shielded at a front by the intermediate casing hub, in the longitudinal direction.

7. The engine assembly according to claim 1, wherein the means for securing the main attachment body on the engine comprise articulated shackles.

8. The engine assembly according to claim 1, wherein the axial retention means also comprise a second screw which is oriented in the longitudinal direction of the engine assembly, and passes through the main attachment body, as well as the front closure rib, so as, with the shearing pin, to ensure jointly the pick-up of the forces associated with the parasitic torsion moment in the longitudinal direction.

9. The engine assembly according to claim 1, wherein the front closure rib is equipped with a second shearing pin parallel to the shearing pin, such that the two pins ensure jointly the pick-up of the forces associated with the parasitic torsion moment in the longitudinal direction.

10. The engine assembly according to claim 1, wherein the engine comprises a fan which is driven by a reducer.

11. An aircraft comprising at least one engine assembly according to claim 1.

12. A process for fitting an engine assembly according to claim 1, comprising the following steps:
- securing the main attachment body on the engine by means of the securing means;
- vertically displacing the engine relative to the strut secured on the aircraft, such that the shearing pin is aligned with, and axially distant from, the orifice for accommodation of the main attachment body;
- axially displacing the engine relative to the coupling strut secured on the aircraft, so as to make the shearing pin penetrate into the orifice for accommodation of the main attachment body; and
- putting into place and securing the first screws, from an area situated at the rear of the main attachment body.

* * * * *